US012638286B2

(12) United States Patent (10) Patent No.: US 12,638,286 B2
Angel et al. (45) Date of Patent: May 26, 2026

(54) METHOD AND SYSTEM TO DETERMINE SURFACE SHAPES OF HELIOSTATS USING FULLY-SAMPLED STARLIGHT IMAGES

(71) Applicant: Arizona Board of Regents on Behalf of the University of Arizona, Tucson, AZ (US)

(72) Inventors: James Roger P. Angel, Tucson, AZ (US); Ryker Eads, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 101 days.

(21) Appl. No.: 18/696,236

(22) PCT Filed: Sep. 28, 2022

(86) PCT No.: PCT/US2022/077166
§ 371 (c)(1),
(2) Date: Mar. 27, 2024

(87) PCT Pub. No.: WO2023/056289
PCT Pub. Date: Apr. 6, 2023

(65) Prior Publication Data
US 2024/0426597 A1 Dec. 26, 2024

Related U.S. Application Data

(60) Provisional application No. 63/249,519, filed on Sep. 28, 2021.

(51) Int. Cl.
*G01B 11/24* (2006.01)
*F24S 50/20* (2018.01)

(52) U.S. Cl.
CPC .............. *G01B 11/24* (2013.01); *F24S 50/20* (2018.05)

(58) Field of Classification Search
CPC ........... G01B 11/24; F24S 50/20; F24S 23/70
See application file for complete search history.

(56) References Cited

U.S. PATENT DOCUMENTS

| | | |
|---|---|---|
| 10,309,689 B2 | 6/2019 | Henault et al. |
| 2013/0139804 A1 | 6/2013 | Goldberg |

(Continued)

FOREIGN PATENT DOCUMENTS

| | | |
|---|---|---|
| WO | 2004/013598 A1 | 2/2004 |
| WO | 2021/062391 | 4/2021 |

OTHER PUBLICATIONS

Angel et al., "Actively Shaped Focusing Heliostat", Solar Paces, (Published May 12, 2022), pp. 120003-1 to 120003-9.

*Primary Examiner* — Seung C Sohn
(74) *Attorney, Agent, or Firm* — Venable LLP; Ryan Ward

(57) ABSTRACT

A method for measuring a shape of a reflector surface of a heliostat at night using a bright star at different elevation and azimuthal settings according to an embodiment of the current invention includes setting the heliostat in fixed orientation such that aberrated and overlapping star images formed are translated due to Earth's rotation in a translation direction across the heliostat array receiver; viewing images of the bright star using a fixed array of cameras placed at or near an array receiver of the heliostat, wherein each camera of the fixed array of cameras has a large aperture lens, and simultaneous exposures are made quickly enough and repeated for long enough, so that, as they translate past the cameras, the aberrated star image is fully sampled in two dimensions, and wherein every point on the reflector surface of the heliostat appears in one or more of the recorded images as being bright from reflected starlight; and processing the recorded images from the fixed array of cameras with (Continued)

a data processor to obtain the surface shape by integration of the surface slopes.

10 Claims, 2 Drawing Sheets

(56)                References Cited

U.S. PATENT DOCUMENTS

| | | | |
|---|---|---|---|
| 2018/0274819 A1 | 9/2018 | Sanchez-Gonzalez et al. | |
| 2018/0299264 A1 | 10/2018 | Hines | |
| 2019/0086122 A1 | 3/2019 | You et al. | |
| 2021/0318033 A1* | 10/2021 | Les Aguerrea | F24S 23/30 |
| 2022/0350109 A1* | 11/2022 | Angel | F24S 23/70 |

* cited by examiner

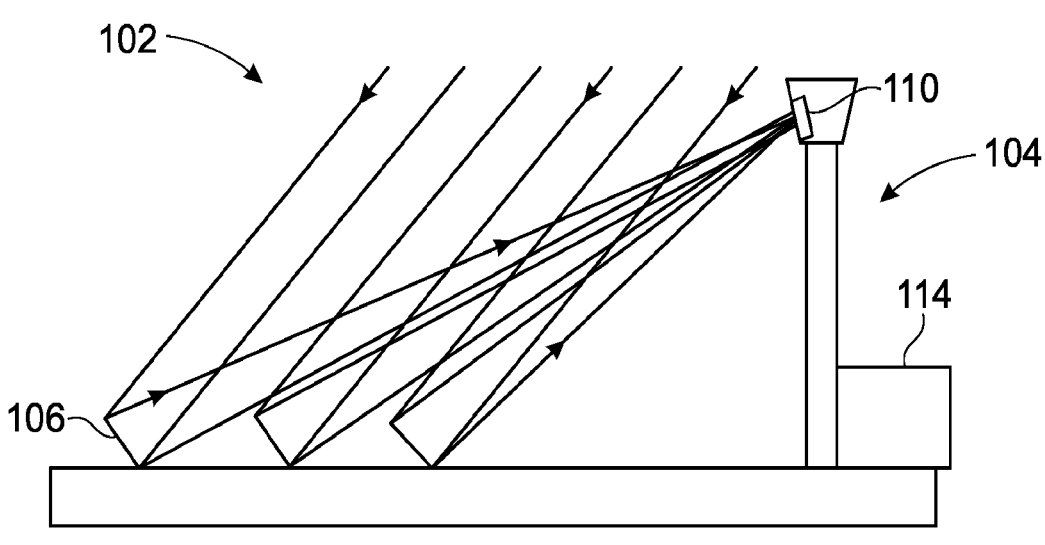
FIG. 1
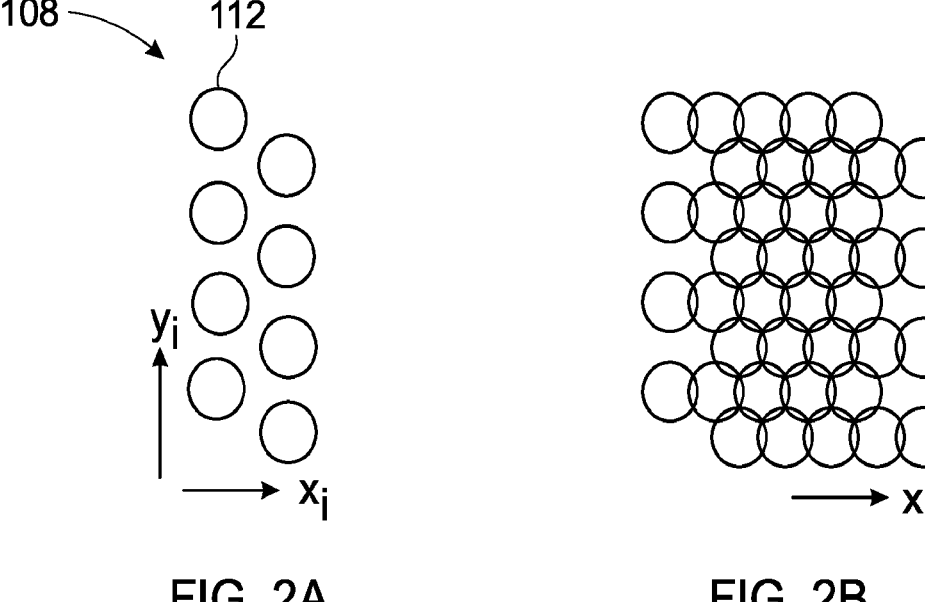
FIG. 2A  FIG. 2B

METHOD AND SYSTEM TO DETERMINE SURFACE SHAPES OF HELIOSTATS USING FULLY-SAMPLED STARLIGHT IMAGES

CROSS-REFERENCE OF RELATED APPLICATION

This application is a U.S. National Stage Application under 35 U.S.C. § 371 PCT/US2022/077166, filed Sep. 28, 2022, which claims priority to U.S. Provisional Application No. 63/249,519 filed Sep. 28, 2021; the entire contents of both are hereby incorporated by reference.

BACKGROUND

1. Technical Field

Currently claimed embodiments of this invention relate to systems and methods to determine surface shapes of heliostats.

2. Discussion of Related Art

In Arqueros et al, 2004 [2] and Hines, 2018 [3], cameras have been used or proposed to be used to image heliostats in starlight reflected to the vicinity of the solar receiver. For any point on the reflector surface that appears bright in the view from a given camera, the slope of the mirror surface at that point may be determined using Snell's law, given the known locations of the star, the reflecting surface point and the camera. Using a plurality of camera, star positions and heliostat orientations, the slopes at a plurality of points on the surface may be determined. In the case of similar metrology but using the sun or full moon as a celestial source of illumination, as described by Henault [4], U.S. Pat. No. 10,309,689 B2, a sparse array of cameras may be used to obtain a full map of the surface shape of a heliostat reflector, provided their spacing is no larger than the solar disc image. The slopes at every point P on the reflector surface are then determined by equation 1, in which the intensities measured from viewpoints m,n are summed, weighted simply by the sign of the x or y coordinate. But if starlight images were analyzed in this way, because the source is a point and not spread out over a disc, the light reflected from many regions across the heliostat surface will fall between cameras in the sparse array, and thus yield no slope information over those areas, and no complete map of surface shape. There thus remains a need for improved systems and methods to determine surface shapes of heliostats.

$$\frac{\partial \Delta(P)}{\partial x} = g_x \varepsilon_0 \frac{\sum_{m=1}^{M} \sum_{n=1}^{N} \text{sign}(x'_{mn}) L(M'_{mn}, P)}{\sum_{m=1}^{M} \sum_{n=1}^{N} L(M'_{mn}, P)} \qquad \text{Eqn. 1}$$

$$\frac{\partial \Delta(P)}{\partial y} = g_Y \varepsilon_0 \frac{\sum_{m=1}^{M} \sum_{n=1}^{N} \text{sign}(y'_{mn}) L(M'_{mn}, P)}{\sum_{m=1}^{M} \sum_{n=1}^{N} L(M'_{mn}, P)}$$

SUMMARY

A method for measuring a shape of a reflector surface of a heliostat at night using a bright star at different elevation and azimuthal settings according to an embodiment of the current invention includes setting the heliostat in fixed orientation such that aberrated and overlapping star images formed are translated due to Earth's rotation in a translation direction across the heliostat array receiver; viewing images of the bright star using a fixed array of cameras placed at or near an array receiver of the heliostat, wherein each camera of the fixed array of cameras has a large aperture lens, the cameras of the fixed array of cameras are configured in a zig-zag line, the fixed array of cameras are oriented perpendicular to the translation direction, and the cameras of the fixed array of cameras are spaced closely enough and set out in a line that is long enough, and simultaneous exposures are made quickly enough and repeated for long enough, so that, as they translate past the cameras, the aberrated star image is fully sampled in two dimensions, and wherein every point on the reflector surface of the heliostat appears in one or more of the recorded images as being bright from reflected starlight; and processing the recorded images from the fixed array of cameras with a data processor to obtain the surface shape by integration of the surface slopes.

A system for measuring a shape of a reflector surface of a heliostat at night using a bright star at any elevation and azimuthal setting according to an embodiment of the current invention includes a fixed array of cameras adapted to be placed at or near an array receiver of the heliostat, wherein each camera of the fixed array of cameras has a large aperture lens, the cameras of the fixed array of cameras are configured in a zig-zag line, the fixed array of cameras are configured to be oriented perpendicular to the translation direction, and the cameras of the fixed array of cameras are spaced closely enough and set out in a line that is long enough, and simultaneous exposures can be made quickly enough and repeated for long enough, so that, as they translate past the cameras, the aberrated star image is fully sampled in two dimensions, and wherein every point on the reflector surface of the heliostat appears in one or more of the recorded images as being bright from reflected starlight; and a processor configured to process the recorded images from the fixed array of cameras with a data processor to obtain the surface shape by integration of the surface slopes.

A computer-executable medium according to an embodiment of the current invention includes non-transient code that when executed by a computer causes the computer to process recorded images from a fixed array of cameras to derive amplitude and direction of surface slope at each point on a reflector surface of a heliostat, using Snell's law, given a known star position at a time of each exposure, and the known position of each point on each heliostat and each camera to obtain the surface shape by integration of the surface slopes. The heliostat is set in fixed orientation such that aberrated and overlapping star images formed are translated due to Earth's rotation in a translation direction across the heliostat array receiver, and images of the bright star are viewed using a fixed array of cameras placed at or near an array receiver of the heliostat, wherein each camera of the fixed array of cameras has a large aperture lens, the cameras of the fixed array of cameras are configured in a zig-zag line, the fixed array of cameras are oriented perpendicular to the translation direction, and the cameras of the fixed array of cameras are spaced closely enough and set out in a line that is long enough, and simultaneous exposures are made quickly enough and repeated for long enough, so that, as they translate past the cameras, the aberrated star image is fully sampled in two dimensions, and wherein every point on the reflector surface of the heliostat appears in one or more of the recorded images as being bright from reflected starlight.

A heliostat system according to an embodiment of the current invention includes a heliostat and a system for measuring a shape of a reflector surface of the heliostat at night using a bright star at any elevation and azimuthal setting. The system for measuring a shape of a reflector surface includes a fixed array of cameras adapted to be placed at or near an array receiver of the heliostat, wherein each camera of the fixed array of cameras has a large aperture lens, the cameras of the fixed array of cameras are configured in a zig-zag line, the fixed array of cameras are configured to be oriented perpendicular to the translation direction, and the cameras of the fixed array of cameras are spaced closely enough and set out in a line that is long enough, and simultaneous exposures can be made quickly enough and repeated for long enough, so that, as they translate past the cameras, the aberrated star image is fully sampled in two dimensions, and wherein every point on the reflector surface of the heliostat appears in one or more of the recorded images as being bright from reflected starlight; and a processor configured to process the recorded images from the fixed array of cameras with a data processor that is programmed to derive amplitude and direction of surface slope at each point on the reflector surface, using Snell's law, given the known star position at the time of each exposure, and the known position of each point on each heliostat and each camera to obtain the surface shape by integration of the surface slopes.

BRIEF DESCRIPTION OF THE DRAWINGS

FIG. 1 is a schematic illustration of heliostats focusing rays of starlight onto cameras near a solar receiver according to an embodiment of the current invention;

FIG. 2A is a schematic illustration in which eight circles represent large aperture lenses of corresponding cameras in a fixed zig-zag array in which a part of a line of cameras extends along the $y_i$ direction according to an embodiment of the current invention;

FIG. 2B is a schematic illustration showing locations of the array of lenses of FIG. 2A relative to an aberrated star image moving in the $x_k$ direction for a time sequence of five out of a longer series of simultaneous exposures according to an embodiment of the current invention.

DETAILED DESCRIPTION

Figure 3:
FIG. 3 shows an example of images of Polaris reflected by a small test heliostat according to an embodiment of the current invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the present invention. All references cited anywhere in this specification are incorporated by reference as if each had been individually incorporated.

Accordingly, FIG. 1 provides a schematic illustration of a heliostat system 100 according to an embodiment of the current invention. The heliostat system 100 includes a heliostat 102 and a system 104 for measuring a shape of a reflector surface 106 of the heliostat at night using a bright star at any elevation and azimuthal setting. Note that there are three reflectors having reflector surfaces illustrated in FIG. 1, only one of which is labeled 106. However, the general concepts of the current invention are not limited to only three reflector surfaces. Actual implementations will often have many more reflectors than just the three that are shown to facilitate an explanation of some concept of the current invention. The system 104 for measuring a shape of a reflector surface 106 includes a fixed array of cameras 108 (FIG. 2A) adapted to be placed at or near an array receiver 110 of the heliostat 102. In FIG. 2A, each circle is schematically representing a camera as well as representing the aperture of the camera In some embodiments, the system 104 can measure more than a single reflector surface 106 of the heliostat 102. For example, in an embodiment, the system 104 can measure all reflector surfaces of the heliostat 102 whether it is three reflector surfaces, or many more than three reflector surfaces.

Each camera, such as camera 112 for example, of the fixed array of cameras 108 has a large aperture lens also represented schematically by the circle. The term large aperture lens means a lens with a focal ratio as fast as f/1 or faster. The cameras of the fixed array of cameras 108 are configured in a zig-zag line and are configured to be oriented perpendicular to the translation direction. The translation direction is a direction a star will be seen as translating due to the Earth's motion. The cameras of the fixed array of cameras 108 are spaced closely enough and set out in a line that is long enough, and simultaneous exposures can be made quickly enough and repeated for long enough, so that, as they translate past the cameras, the aberrated star image is fully sampled in two dimensions, and wherein every point on the reflector surface of the heliostat appears in one or more of the recorded images as being bright from reflected starlight.

The system 104 for measuring the shape of the reflector surface 106 also includes a processor configured to process the recorded images from the fixed array of cameras with a data processor 114 that is programmed to derive amplitude and direction of surface slope at each point on the reflector surface 106, using Snell's law, given the known star position at the time of each exposure, and the known position of each point on each heliostat and each camera to obtain the surface shape by integration of the surface slopes.

In a method according to an embodiment of the current invention, a bright star is used to measure at night the shape of heliostat reflectors at different elevation and azimuthal settings. The heliostats are set in fixed orientation, such that the aberrated and overlapping star images they form are translated, due to Earth's rotation, across the heliostat array receiver. The images are viewed by a fixed array of cameras, at or near the receiver. The cameras, which have large aperture lenses, are configured in a line, preferably zigzagging down the line, which is oriented perpendicular to the translation direction. The cameras are spaced closely enough and set out in a line that is long enough, and simultaneous exposures are made quickly enough and repeated for long enough, so that, as they translate past the cameras, the blurred star images are fully sampled in two dimensions. Then every point on the reflector surfaces of the viewed heliostats will appear in one or other of the recorded images as bright from reflected starlight. From these data the amplitude and direction of the surface slope at each of these points may be computed using Snell's law, given the known star position at the time of each exposure, and the known position of each point on each heliostat and each camera. The surface shape is then obtained by integration of the surface slopes.

In the method described here, images of heliostats are formed by cameras located, as shown in FIG. 1, near the heliostat field receiver. The cameras view the heliostats from points distributed continuously across the entire aberrated image of a star. From these data, the slope is obtained across all points across the entire reflecting surfaces of the heliostats, and their shape may thus be obtained at every point. Images from all viewpoints are obtained by using closely spaced cameras equipped with large aperture ~f/1 lenses, and by taking advantage of Earth's motion to translate starlight images from stationary heliostats across the cameras.

FIG. 2A shows eight out of a fixed zig-zag line of cameras in coordinate system $x_i$, $y_i$, with lens apertures the size of the circles, according to an embodiment of the current invention. The full line of cameras along the $y_i$ direction take simultaneous exposures. FIG. 2B shows the location of lenses relative to the moving star image in a time sequence of five simultaneous exposures of all the cameras, with motion in the direction $x_k$ perpendicular to the camera line. The exposures are made at short enough intervals that the aperture positions overlap and leave no gaps, as shown. The series of exposures is continued long enough to obtain complete cover of the aberrated star focus as it moves across the line of lenses.

Analysis and Modeling

Suppose a heliostat has P-V surface slope error=PV (mrad). For a star at declination angle $\delta$, its angular speed $\omega$ across the sky is given by $$\omega = 2\pi\cos(\delta)/\text{day} = 0.00436 \ \cos(\delta)/\text{min.} \tag{2}$$

Thus, the time t for the full diameter of an aberrated star image formed by a heliostat to cross a line perpendicular to drift motion is given by $$T = PV/4.36\cos(\delta) \ \text{minutes.} \tag{3}$$

The image of a star formed by this heliostat will have a maximum angular diameter of 2 PV. (Rays reflect at an angle of twice the surface slope error). If the heliostat has focal length F, then the image diameter D is given by $$D = 2PV \cdot F \tag{4}$$

A complete aberrated image of the star may be recorded by a line of cameras of length D set perpendicular to the star image motion. For a zig-zag line of cameras as drawn in FIG. 1, the vertical separation s of cameras of aperture d to ensure complete cover is given by $$s = 1.5d. \tag{5}$$

It follows that the number N of cameras needed in a zig-zag line of length D is given by $$N = 2D/1.5d = 1.33D/d. \tag{6}$$

For the desired complete sample, the star image must move slowly enough so its linear motion during exposure time t is less than 3d/4=0.75d; i.e $$\omega FT < 0.75d \tag{7}$$

It follows from eqn.2 that $$t < 0.75d/\omega, \text{ or } T < 163/(F \cdot \cos(\delta)) \tag{8}$$

Examples for Different Heliostats, Using Cameras with Inexpensive Large-Aperture Lenses Our examples are worked out for CMOS cameras using lenses made in high volume and at low cost. FIG. 3 shows individual test exposures made using such a camera of a mini-heliostat, with a mirror 0.5 m in diameter bent approximately concave with 25 m focal length, reflecting the pole star Polaris to a focus. The three 0.5 second exposures of the pole star shown were taken with a 36 mm aperture camera at the mirror focus, the camera displaced vertically by 40 mm (0.8 mrad in surface slope) between each one.

For the following examples we choose a camera with a somewhat larger aperture, using a commonly available lens costing $120, with d=45 mm, a focal length of 50 mm and a field of view of 13°×17° on an MFT format detector. This is large enough to view and image a dozen or more heliostats simultaneously. The equivalent exposure for this larger lens is 0.32 seconds.

Example 1. Heliostats with F=100 m Focal Length

For this example, according to an embodiment of the current invention, taken to have P-V surface slope error of 4 mrad PV, the time T to record all the exposures (eqn. 3) is 0.92/cos($\delta$) minutes. The full image diameter (eqn. 4) is 0.8 m, and 24 cameras are needed (eqn. 6). The maximum exposure time t (eqn. 8) is 1.63/cos($\delta$) seconds.

Example 2. Heliostats with F=1000 m Focal Length

For this example, the P-V surface slope error is again taken to be 4 mrad PV. The time T to record all the exposures (eqn. 3) remains at 0.92/cos($\delta$) minutes, but now the full image diameter (eqn. 4) is 8 m, and N=240 cameras are needed. The maximum exposure time t (eqn. 8) is 0.163/cos($\delta$) seconds. This speed is realistically achieved for bright stars over the whole sky (cos($\delta$)≤1). We note that 50 mm focal length lenses imaging onto CMOS detectors with 10 μm pixels will map surface structure with 20 cm resolution for heliostats at 1 km distance and give higher resolution for closer ones.

Computation of Slope and Surface Maps

During a set of exposures, the $i^{th}$ camera, whose position in the camera array coordinate system as shown in FIG. 2A is $(x_i, y_i)$, takes its $k^{th}$ image at drift coordinate $x_k$. It records brightness $L(x_i+x_k, y_i, x_j, y_j)$ at the position $(x_j, y_j)$ of the $j^{th}$ pupil segment in the coordinate system of the heliostat. In our method, the slope error of the segment is calculated by:

$$\frac{\partial Z_{err}}{\partial x}(x_j, y_j) = \frac{\sum_k \sum_i (x_i + x_k) L(x_i + x_k, y_i, x_j, y_j)}{2F \sum_k \sum_i L(x_i + x_k, y_i, x_j, y_j)} \tag{Eqn. 9}$$

-continued $$\frac{\partial Z_{err}}{\partial y}(x_j, y_j) = \frac{\sum_k \sum_i (y_i) L(x_i + x_k, y_i, x_j, y_j)}{2F \sum_k \sum_i L(x_i + x_k, y_i, x_j, y_j)}$$

where F is the focal length (slant range distance), and the weighting of the brightnesses L are by the x or y value of the viewpoint relative to the aberrated image. The resulting slope errors are relative to the ideal off-axis paraboloidal heliostat reflector surface shape that would form a focused point image of the star at the center of the sampled image. The actual surface shape relative to the ideal shape is obtained by integration of these slopes across the reflector surface. The pointing error is given by the overall tilt of this surface, and the shape after tilt subtraction gives the residual shape error.

Computer Simulation of Performance

The accuracy of the method was evaluated by computer modeling for the case of a 6 m heliostat at a distance F=200 m, imaged by an array of 50 mm aperture cameras. Curvature and astigmatism test errors were imposed on the heliostat surface, long exposure images simulated, and the surface errors reconstructed as described above. The method recovered the surface shapes to better than 0.05 mrad RMS accuracy (i.e. ~1% measurement accuracy of the required toroidal curvatures).

DISCUSSION

The method is able to measure from the receiver tower the surfaces of all the heliostats within each camera's field of view. It is particularly powerful in that it is a null measurement: the surface profile measured is the error of the actual surface relative to the ideal surface shape needed to focus an image of the solar disc at the receiver from the selected position in the sky.

For the example of cameras using 50 mm focal length lenses, an imager with 13×17 nm MFT format has a field of view covering a solid angle of 0.09 steradian. If a full 360-degree heliostat field from the tower extends 1 radian in vertical angle, all the heliostats can be measured in less than 100 settings, taken over a couple of hours. Thus, all can be measured at several different orientations during one night.

REFERENCES

1. R. Angel, R. Eads, N. Didato, M. Rademacher, N. Emerson and C. Davila, "Actively Shaped Focusing Heliostat" Solar Paces (2020).
2. WO2004013598A1 by Femando Arqueros Martinez, Method for the optical characterization of large mirrors consisting in recording the light reflected from a star"
3. B. Hines, (2018), U.S. patent Ser. No. 02/992,641 A1
4. U.S. Pat. No. 10,309,689 B2, Facility For Concentrating Cosmic Radiation Equipped With A Reflective Optical Surface Inspection System Inventors: Frangois Henault and Cyril Caliot While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A method for measuring a shape of a reflector surface of a heliostat at night using a bright star at different elevation and azimuthal settings, comprising:

setting the heliostat in fixed orientation such that aberrated and overlapping star images formed are translated due to Earth's rotation in a translation direction across the heliostat array receiver;

viewing images of the bright star using a fixed array of cameras placed at or near an array receiver of the heliostat, wherein each camera of the fixed array of cameras has a corresponding lens, the cameras of the fixed array of cameras are configured in a zig-zag line, the fixed array of cameras are oriented perpendicular to the translation direction, and the cameras of the fixed array of cameras are spaced and set out in a line of a length and simultaneous exposures are made and repeated so that, as they translate past the cameras, the aberrated star image is fully sampled in two dimensions, and wherein every point on the reflector surface of the heliostat appears in one or more of the recorded images as being bright from reflected starlight; and processing the recorded images from the fixed array of cameras with a data processor to obtain the surface shape by integration of the surface slopes.

2. The method according to claim 1, wherein said data processor is programmed to derive amplitude and direction of surface slope at each point on the reflector surface, using Snell's law, given the known star position at the time of each exposure, and the known position of each point on each heliostat and each camera.

3. A system for measuring a shape of a reflector surface of a heliostat at night using a bright star at any elevation and azimuthal setting, comprising:

a fixed array of cameras adapted to be placed at or near an array receiver of the heliostat, wherein each camera of the fixed array of cameras has a corresponding lens, the cameras of the fixed array of cameras are configured in a zig-zag line, the fixed array of cameras are configured to be oriented perpendicular to the translation direction, and the cameras of the fixed array of cameras are spaced and set out in a line of a length and simultaneous exposures can be made and repeated so that, as they translate past the cameras, the aberrated star image is fully sampled in two dimensions, and wherein every point on the reflector surface of the heliostat appears in one or more of the recorded images as being bright from reflected starlight; and a processor configured to process the recorded images from the fixed array of cameras with a data processor to obtain the surface shape by integration of the surface slopes.

4. The system according to claim 3, wherein said data processor is programmed to derive amplitude and direction of surface slope at each point on the reflector surface, using Snell's law, given the known star position at the time of each exposure, and the known position of each point on each heliostat and each camera.

5. The system according to claim 3, wherein said fixed array of cameras are configured in a zig-zag line with separations s satisfying the equation s=1.5d, where d is an aperture of the cameras of the fixed array of cameras.

6. The system according to claim 3, wherein said fixed array of cameras are N cameras given by the equation N=1.33D/d where d is an aperture of the cameras of the fixed array of cameras and D=2 PV·F, the heliostat has focal length F, and the heliostat has P-V surface slope error=PV (mrad).

7. A computer-executable medium comprising non-transient code that when executed by a computer causes the computer to:

process recorded images from a fixed array of cameras to derive amplitude and direction of surface slope at each point on reflector surface of a heliostat, using Snell's law, given a known star position at a time of each exposure, and the known position of each point on each heliostat and each camera to obtain the surface shape by integration of the surface slopes, wherein the heliostat is set in fixed orientation such that aberrated and overlapping star images formed are translated due to Earth's rotation in a translation direction across the heliostat array receiver, wherein images of the bright star are viewed using a fixed array of cameras placed at or near an array receiver of the heliostat, wherein each camera of the fixed array of cameras has a corresponding lens, the cameras of the fixed array of cameras are configured in a zig-zag line, the fixed array of cameras are oriented perpendicular to the translation direction, and the cameras of the fixed array of cameras are spaced and set out in a line of a length and simultaneous exposures are made and repeated so that, as they translate past the cameras, the aberrated star image is fully sampled in two dimensions, and wherein every point on the reflector surface of the heliostat appears in one or more of the recorded images as being bright from reflected starlight.

8. A heliostat system, comprising:

a heliostat; and a system for measuring a shape of a reflector surface of the heliostat at night using a bright star at any elevation and azimuthal setting, said system for measuring a shape of a reflector surface, comprising:

a fixed array of cameras adapted to be placed at or near an array receiver of the heliostat, wherein each camera of the fixed array of cameras has a corresponding lens, the cameras of the fixed array of cameras are configured in a zig-zag line, the fixed array of cameras are configured to be oriented perpendicular to the translation direction, and the cameras of the fixed array of cameras are spaced and set out in a line of a length and simultaneous exposures can be made and repeated so that, as they translate past the cameras, the aberrated star image is fully sampled in two dimensions, and wherein every point on the reflector surface of the heliostat appears in one or more of the recorded images as being bright from reflected starlight; and a processor configured to process the recorded images from the fixed array of cameras with a data processor that is programmed to derive amplitude and direction of surface slope at each point on the reflector surface, using Snell's law, given the known star position at the time of each exposure, and the known position of each point on each heliostat and each camera to obtain the surface shape by integration of the surface slopes.

9. The heliostat system according to claim 8, wherein said fixed array of cameras are configured in a zig-zag line with separations s satisfying the equation s=1.5d, where d is an aperture of the cameras of the fixed array of cameras.

10. The heliostat system according to claim 8, wherein said fixed array of cameras are N cameras given by the equation N=1.33D/d where d is an aperture of the cameras of the fixed array of cameras and D=2 PV·F, the heliostat has focal length F, and the heliostat has P-V surface slope error=PV (mrad).

* * * * *